United States Patent
Yamashita et al.

(10) Patent No.: US 8,725,930 B2
(45) Date of Patent: May 13, 2014

(54) SEMICONDUCTOR MEMORY DEVICE

(75) Inventors: Hideaki Yamashita, Kyoto (JP);
Takeshi Ootsuka, Hyogo (JP)

(73) Assignee: Panasonic Corporation, Osaka (JP)

( * ) Notice: Subject to any disclaimer, the term of this patent is extended or adjusted under 35 U.S.C. 154(b) by 931 days.

(21) Appl. No.: 12/637,892

(22) Filed: Dec. 15, 2009

(65) Prior Publication Data
US 2010/0153629 A1  Jun. 17, 2010

(30) Foreign Application Priority Data

Dec. 17, 2008 (JP) .................. 2008-320706

(51) Int. Cl.
*G06F 12/00* (2006.01)
(52) U.S. Cl.
USPC ............ 711/103; 711/154; 711/111; 711/202
(58) Field of Classification Search
USPC ........................................................ 711/103
See application file for complete search history.

(56) References Cited

U.S. PATENT DOCUMENTS

| | | | |
|---|---|---|---|
| 6,170,066 B1 * | 1/2001 | See | 714/22 |
| 6,510,083 B1 * | 1/2003 | See et al. | 365/185.24 |
| 7,039,788 B1 * | 5/2006 | Chang et al. | 711/203 |
| 2005/0273548 A1 * | 12/2005 | Roohparvar | 711/103 |
| 2007/0021963 A1 * | 1/2007 | Deng et al. | 705/1 |

FOREIGN PATENT DOCUMENTS

JP  2006-318366  11/2006

* cited by examiner

*Primary Examiner* — April Y Blair
*Assistant Examiner* — Prasith Thammavong
(74) *Attorney, Agent, or Firm* — Renner, Otto, Boisselle & Sklar, LLP.

(57) ABSTRACT

A command analyzer 160 determines whether or not a first write command after power-on is issued. A new block reserve determinator 170 determines that a new physical block is reserved, in a case where the command analyzer 160 determines that first writing command after power-on is issued and the physical block corresponding to a logical address at which a host device requests transmit is in a written state. At this time, the semiconductor memory device writes data to the new physical block. Thereby, data written before power disconnection does not been destroyed.

4 Claims, 16 Drawing Sheets

F I G. 7
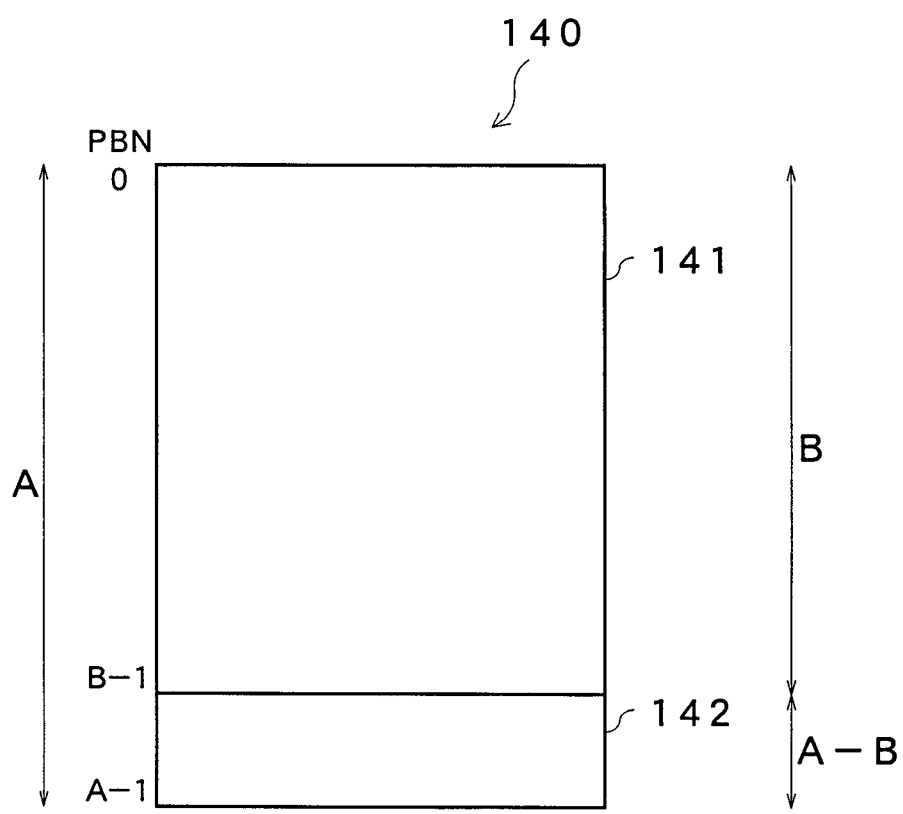

FIG. 8A

| Logical Block No. | 0 | 1 | ......... | L | L+1 | ......... | B−m |
|---|---|---|---|---|---|---|---|
| Physical Block No. | 3 | 6 | | A | A | | B−2 |

| Logical Block No. | |
|---|---|
| Physical Block No. | |

| Physical Block No. | 0 | 1 | 2 | 3 | ................. | B−1 |
|---|---|---|---|---|---|---|
| Use state | 1 | 0 | 0 | 1 | | 0 |

182

FIG. 13
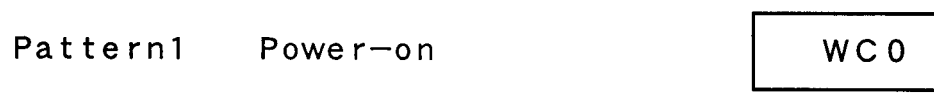
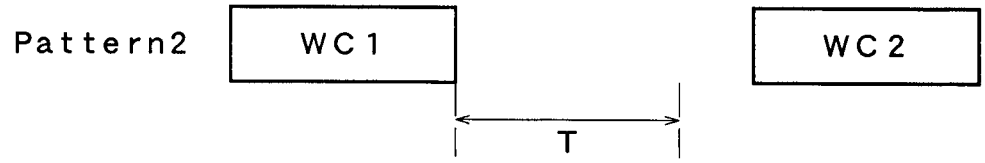
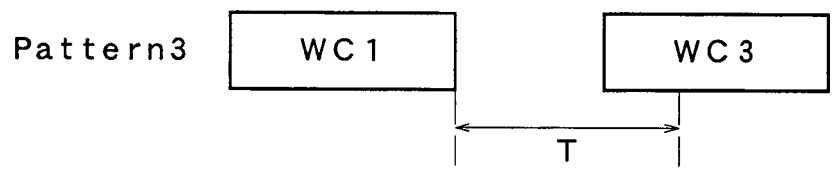
Time

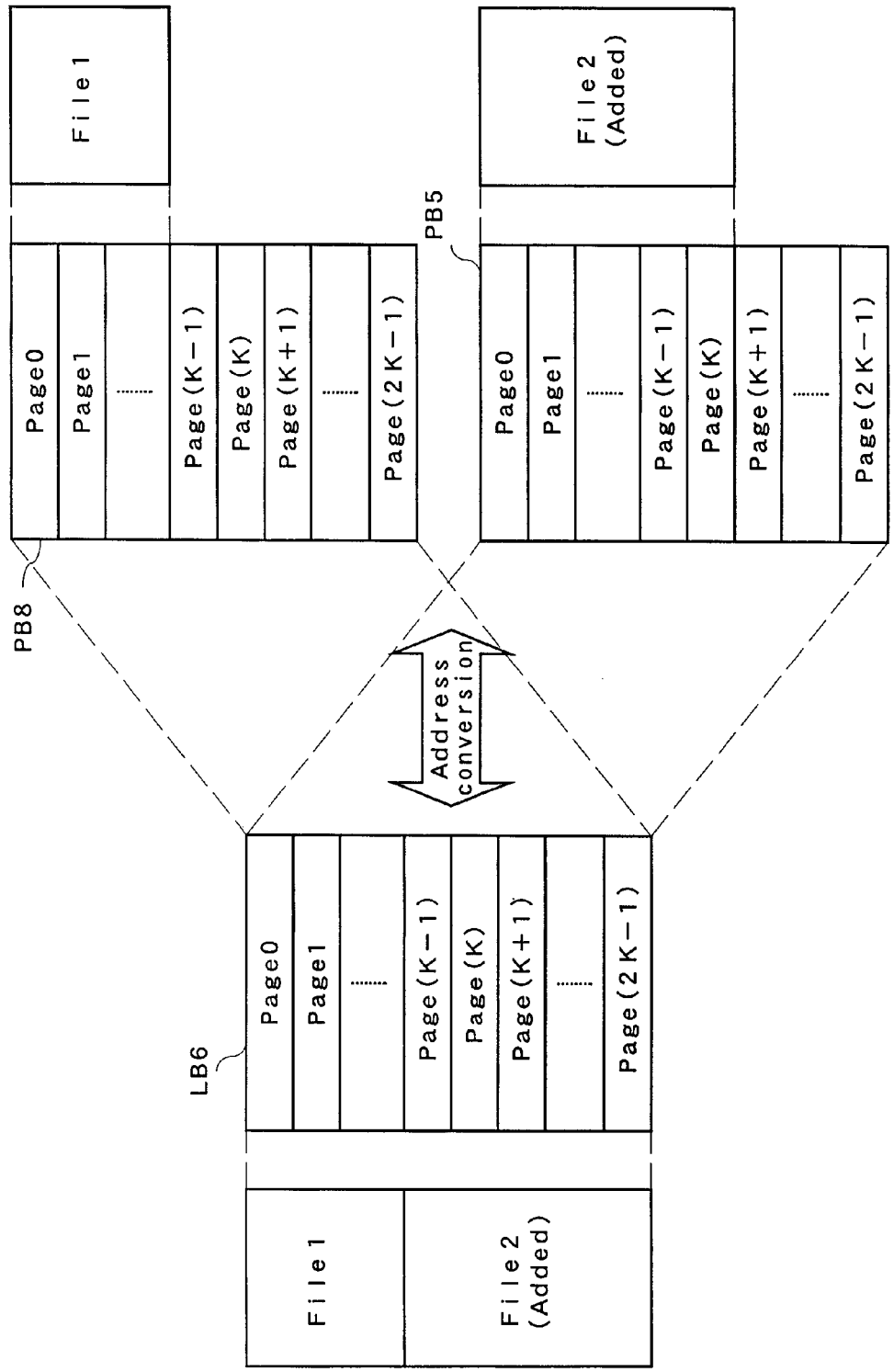

FIG. 15A

| Logical Block No. | 0 | 1 | ............ | 6 | 7 | ............ | B−m |
|---|---|---|---|---|---|---|---|
| Physical Block No. | 3 | 6 | | 8 | A | | B−2 |

| Logical Block No. | 6 |
|---|---|
| Physical Block No. | 5 |

F I G. 1 7
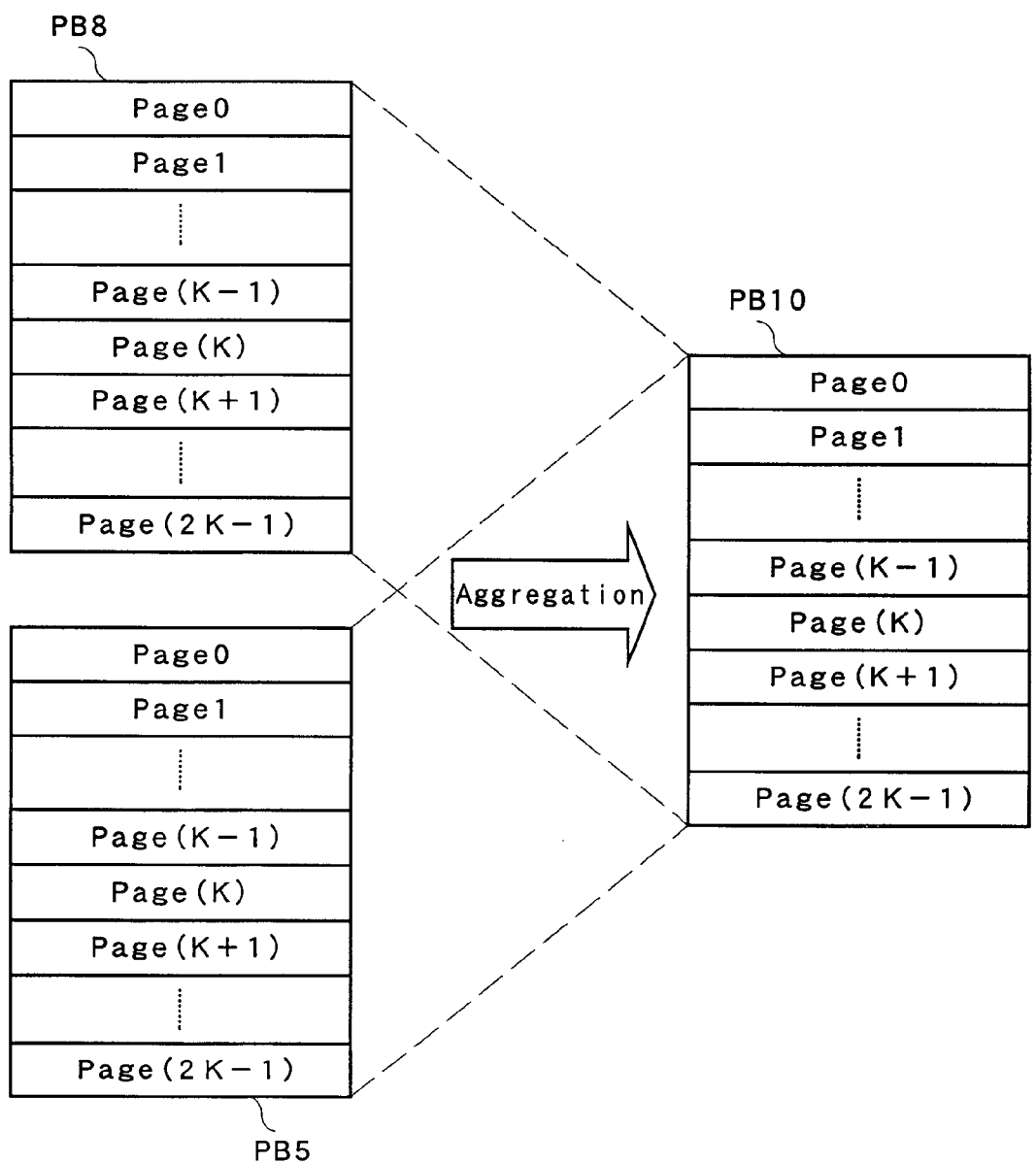

F I G. 1 8 A

181a

| Logical Block No. | 0 | 1 | ......... | 6 | 7 | ......... | B−m |
|---|---|---|---|---|---|---|---|
| Physical Block No. | 3 | 6 | | 10 | A | | B−2 |

F I G. 1 8 B

181b

| Logical Block No. | 6 |
|---|---|
| Physical Block No. | A |

SEMICONDUCTOR MEMORY DEVICE

BACKGROUND OF THE INVENTION

1. Field of the Invention

The present invention relates to a semiconductor memory device such as a memory card, in particular, a technique of repairing a write error occurring in an internal nonvolatile memory.

2. Discussion of the Related Art

Conventionally, a semiconductor memory device such as an SD (Secure Digital) card as a card-type recording medium which has a flash memory therein is very small and thin and due to its handiness, is widely used for recording data such as images in a digital camera, portable equipment and so on.

The flash memory contained in the semiconductor memory device is a nonvolatile memory which can erase and rewrite data in units of block of a uniform size. To address a demand for an increase in capacity in recent years, the flash memory capable of storing data of two bits or more in one cell has been commercialized.

Relationship between the number of electrons accumulated in a floating gate of an MLC (multi-level cell) flash memory (hereinafter referred to as a multi-level flash memory) to express 2-bit information per cell and a threshold voltage (Vth) will be described referring to FIGS. 1A, 1B and 2.

FIGS. 1A and 1B show a structure of one cell of a flash memory. A flash memory 10 is configured by forming an N-channel source and drain electrodes 12, 13 on a P-channel substrate 11 and laminating a tunnel oxide film 14, a floating gate 15, an insulating oxide film 16 and a control gate 17 between the source electrode 12 and drain electrode 13. Thus, as distinct from a volatile dynamic random access memory (DRAM), the flash memory has the floating gate 15 as an area for holding an electrical charge within a transistor. A voltage threshold during a current flows changes depending on a state of the electrical charges accumulated in the floating gate 15. FIG. 1A shows an initial state before data writing where electrical charges are not accumulated and FIG. 1B shows a state where electrical charges are accumulated and data is written.

FIG. 2 shows an example of relationship between the number of electrons accumulated in the floating gate of a multi-level flash memory and a threshold voltage (Vth). In a case of a binary flash memory, a voltage during the current flows changes depending on the presence or absence of electrons in the floating gate. However, in a case of a four-valued flash memory expressing 2-bit information per cell, four threshold voltages during the current flow exist depending on the amount of electrical charges. As shown in FIG. 2, in the four-valued flash memory, an electron accumulating state in the floating gate is managed in four states according to its threshold voltage (Vth). An electric potential in an erasure state is the lowest and this state is defined as (1, 1). As electrons are accumulated, the threshold voltage discretely rises and these states are defined as (1, 0), (0, 0) and (0, 1). Since the electrical potential rises in proportion to the number of accumulated electrons, data of two bits can be recorded in one memory cell by controlling the electrical potential so as to fall below a predetermined threshold value.

FIG. 3 is a schematic view of one physical block of the four-valued flash memory. The physical block shown in FIG. 3 is formed of 2K (K is a natural number) pages. Writing processing is performed from a page number 0 in ascending order. Here, it is assumed that a page with a page number m (0=m<K) and a page with a page number (K+m) share one memory cell (hereinafter referred to as cell sharing relationship). In pages having the cell sharing relationship, a page to be written first is referred to as a first page and a page to be written next is referred to as a second page. In other words, writing to the page number m (writing to the first page) and writing to the page number (K+m) (writing to the second page) mean that electrons are charged to a same cell. Describing referring to FIG. 2, it is controlled so that the electrical potential only rises up to a half at a maximum in writing to the first page and rises from the half to the maximum in writing to the next second page.

FIG. 4 shows shift of the state of the flash memory cell. As shown in FIG. 4, a state of one memory cell of a physical block of the flash memory shifts as follows.

(a) The memory cell state is (1, 1) after data erasure.
(b) The memory cell state is (1, 1) or (1, 0) after writing to the first page.
(c) The memory cell state is (1, 1), (1, 0), (0, 0) or (0, 1) after writing to the second page.

As described above, in the multi-level flash memory, multi-level recording of providing a plurality of states of the threshold voltage Vth and controlling an amount of accumulated electrons is performed, thereby realizing an increase in capacity.

The above-mentioned cases (b), (c) will be described in more detail. In the case (b), a state after 1 is written to a corresponding logical page is (1, 1). A state after 0 is written is (1, 0). In the case (c), shift is limited depending on the state of the case (b). That is, in shift from the state (1, 1) in (b), the state (1, 1) is maintained when 1 is written and the state (1, 1) shifts to the state (0, 1) when 0 is written. Meanwhile, in shift from the state (1, 0) in (b), the state (1, 0) is maintained when 1 is written and the state (1, 1) shifts to the state (0, 0) when 0 is written. Thus, in a same physical page, a value in the first page is reflected on a second bit and the value in the second page to be written next is reflected on a first bit.

The flash memory uses the tunnel oxide film 14 having an insulating function to hold the electrical charges accumulated in the floating gate 15. In writing and erasure, electrons pass through the oxide film and thus, an oxide film becomes to deteriorate. When writing is repeated, the oxide film is damaged and cannot act for insulation. For this reason, the flash memory has the feature that the number of times of writing is limited.

Next, an occurrence of the write error will be described. In the case of the four-valued flash memory, the memory cell is shared by two logical pages of the first page and second page. Writing to the pages 0 to (K−1) in FIG. 3 is writing to the first page. In this case, a write error is due to that Vth does not rise from the state of (1, 1) to the state of (1, 0). Writing to pages K to (2K−1) in FIG. 3 is writing to the second page and a state of Vth becomes (1, 1), (1, 0), (0, 0), (0, 1). In this case, the write error is one of the following errors.

(Error 1) Vth does not rise from (1, 0) to (0, 0).
(Error 2) Vth does not from (1, 0) to (0, 1).

Vth (1, 0) is adjacent to Vth (0, 0) in the case of the error 1, while two states are interposed between Vth (1, 1) and Vth (0, 1) in the case of the error 2. Especially Vth (1, 0) is a value after writing to the first page and in a case where Vth only rises to (1, 0) after writing to the second page, the second page has a write error, further causing corruption of data in the first page.

Next, the possibility that the write error destroys another file will be described in more detail. A left side in FIG. 5 shows a logical block in a logical address space and corresponds to the physical block in a physical address space of a flash memory in a right side in FIG. 5. A file 1 has been already written to the physical block and a file 2 is added later. It is assumed that the file 1 has been already recorded from the page 0 to the page (K−2) in the physical address space and the file 2 is added from the page (K−1) to the page (2K−1). In this example, for simplification of description, the gages are used in ascending order. During writing of the file 2, for example, as shown in FIG. 5, data written to the page 0 can be destroyed due to a write error occurred during writing to the page k or sudden power disconnection. In other words, when the data in the page 0 is destroyed, the file 1 may be also destroyed by writing of the file 2.

To solve this problem, in Japanese Unexamined Patent Publication No. 2006-318336, a memory controller for controlling a flash memory is provided with a buffer memory and data in a first page is stored in the buffer memory until writing to a second page is completed, and when a write error occurs due to writing to the second page, the data in the buffer memory is loaded and the data in the first page is also written to the flash memory.

SUMMARY OF THE INVENTION

However, according to a conventional method, the data in a first page needs to be held in the buffer memory until writing to a second page is completed. In a case where a plurality of files are written to one physical block, data other than a file which is being written is data written in the past and the data does not exist yet in a host device or semiconductor memory device. For this reason, disadvantageously, there are cases that retry cannot be performed and thus, data recovery is impossible.

When power disconnection suddenly occurs during data writing, even if data for recovery is held, retry itself cannot be performed, resulting in that the data cannot be disadvantageously recovered.

To solve the above-mentioned problem, an object of the present invention is to provide a highly reliable semiconductor memory device which prevents propagation of the write error to the written data when the data write error or sudden power disconnection occurs.

To solve the problem, a semiconductor memory device of the present invention connected to a host device comprises: a nonvolatile memory including a plurality of physical blocks; a data writer for writing data to said nonvolatile memory; a data reader for reading data from said nonvolatile memory; a memory manager including a logical-physical conversion table for recording correspondence between a logical block according to a command issued by said host device and physical block of said nonvolatile memory, the memory manager converting a logical address given by said host device into a physical address of said nonvolatile memory; a command analyzer for analyzing the command received from said host device and analyzing correlation between a write command issued at least immediately before and the command; and a new block reserve determinator for determining that a new physical block is reserved in a case where, when the write command is issued from said host device, said command analyzer determines that first writing processing after power-on is performed and the physical block corresponds to the logical address at which said host device requests to transmit data is in a written state.

Said new block reserve determinator may determine that a new physical block is reserved in a case where said command analyzer determines that first writing processing after power-on is performed and the physical block corresponding to the logical address at which said host device requests to transmit data is in a written state, and in a case where writing is performed after elapse of a predetermined time from the writing according to the write command issued at least immediately before.

Said command analyzer may include a timer for measuring an elapsed time from completion of data writing according to the write command issued at least immediately before, and when a timer value exceeds a predetermined elapsed time, even when the physical block corresponding to the logical address at which said host device requests to transmit data is in a written state, said new block reserve determinator determine that a new physical block is reserved without additionally writing data in the physical block.

Said memory manager may register and update a free block management table representing availability/unavailability of each physical block and extract a new physical block in data writing based on said free block management table.

Said memory may be a multi-level flash memory and given that a unit sharing a memory cell is a group, said physical block may include at least one group.

Said physical block may be a minimum erasing unit of said memory or an integral multiple of the minimum erasing unit.

In the semiconductor memory device according to the present invention, at a first write command after power-on, the new block reserve determinator determines that a new block is reserved. At this time, data is written to the physical block in which data is not written. By doing so, data in the first page which shares the cell does not contain data recorded in the past. For this reason, it is possible to prevent sudden power disconnection during writing to the second page from propagating an error to the data recorded in the past. Furthermore, since the new block is reserved only at power-on and after a predetermined time has elapsed, the number of times of rewriting increases only a few.

BRIEF DESCRIPTION OF THE DRAWINGS

FIG. 7 is an explanatory diagram showing a memory area of the flash memory;

FIG. 8A is an explanatory diagram showing a logical-physical conversion main table in the present embodiment; and FIG. 8B is an explanatory diagram showing a logical-physical conversion auxiliary table in the present embodiment;

FIG. 9 is an explanatory diagram showing a free block management table in the present embodiment;

FIG. 13 is an explanatory diagram showing determination whether or not a new physical block is reserved in the present embodiment;

FIG. 14 is an explanatory diagram showing procedure of writing a file to another physical block in the present embodiment;

FIG. 15A is an explanatory diagram of a logical-physical conversion main table in which one logical block is formed of two physical blocks in the present embodiment;

FIG. 15B is an explanatory diagram of a logical-physical conversion auxiliary table in which one logical block is formed of two physical blocks in the present embodiment;

FIG. 17 is an explanatory diagram showing procedure of aggregating two physical blocks into one block in the present embodiment;

FIG. 18A is an explanatory diagram of the logical-physical conversion main table in which one logical block is formed of one physical block in the present embodiment;

FIG. 18B is an explanatory diagram of the logical-physical conversion auxiliary table in which one logical block is formed of one physical block in the present embodiment.

DESCRIPTION OF THE PREFERRED EMBODIMENT

Figure 6:
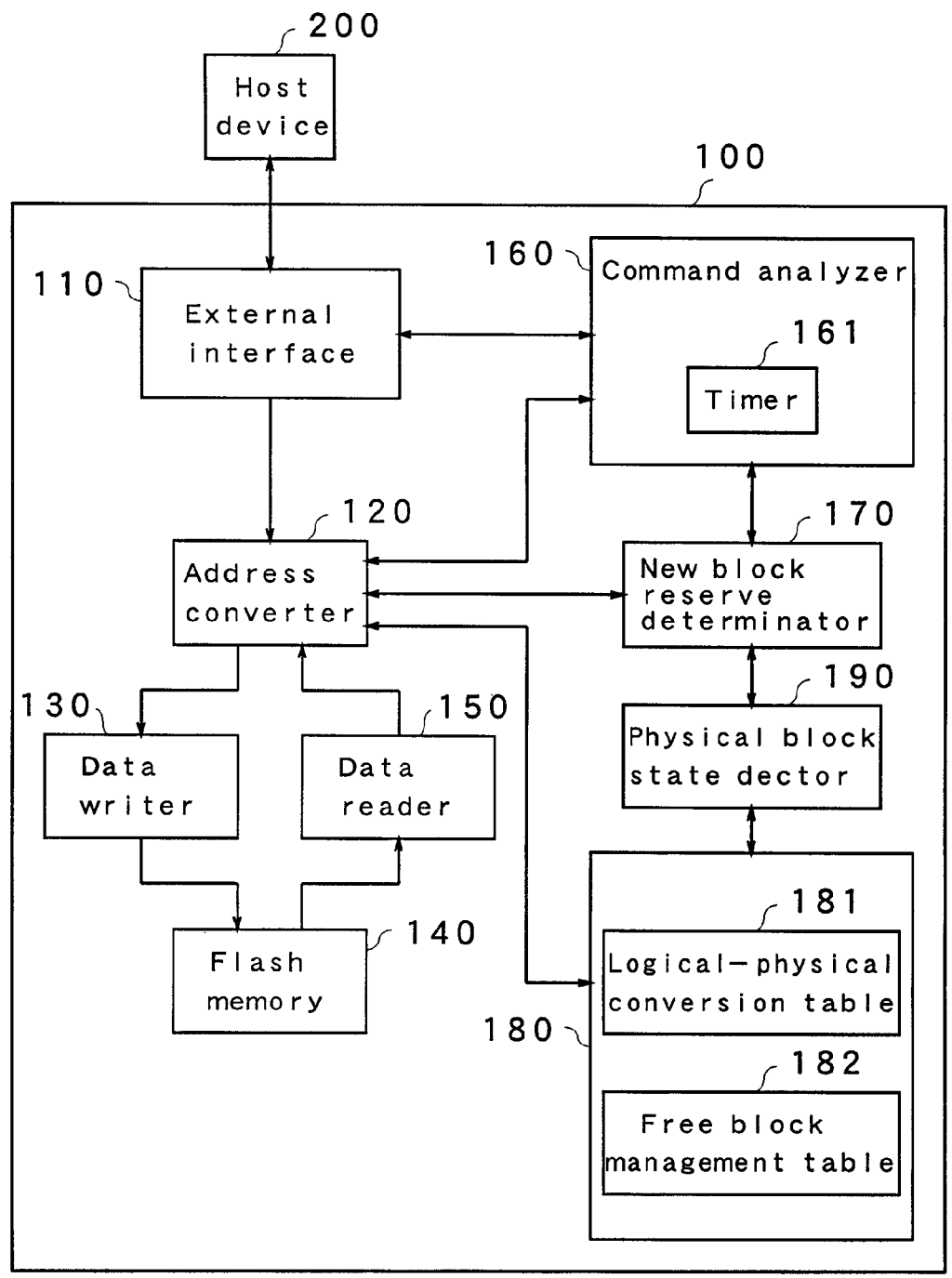
FIG. 6 is a configuration diagram showing a structure of a semiconductor memory device in accordance with an embodiment of the present invention.

FIG. 6 is configuration diagrams of a semiconductor memory system in accordance with an embodiment of the present invention. The semiconductor memory system includes a semiconductor memory device 100 and host device 200 for controlling the semiconductor memory device 100 and performing data writing and reading. The semiconductor memory device 100 stores data according to a write command from the host device 200 and reads data to the host device 200 according to a read command.

Next, each block of the semiconductor memory device 100 in the present embodiment will be described. An external interface 110 is an interface for receiving the command and data from the host device 200 and transmitting the data.

An address converter 120 converts a logical address at which the host device 200 request data reading/writing based on a logical-physical conversion table described later into a physical address in the semiconductor memory device 100.

A data writer 130 records data transmitted from the external interface 110 to each page of the physical block of the flash memory 140.

Figure 1A:
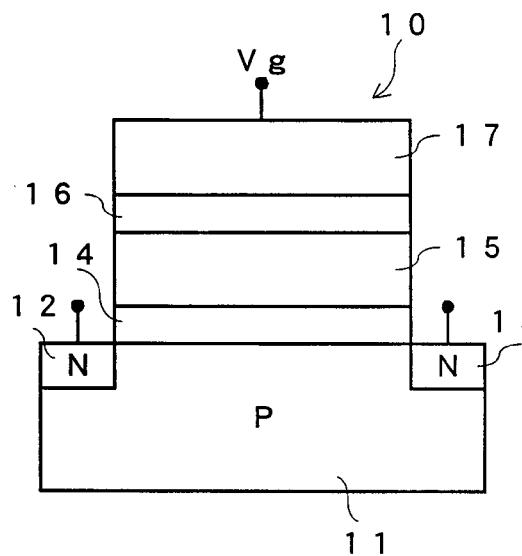
FIG. 1A is a schematic view showing a structure of a multi-level flash memory.
Figure 1B:
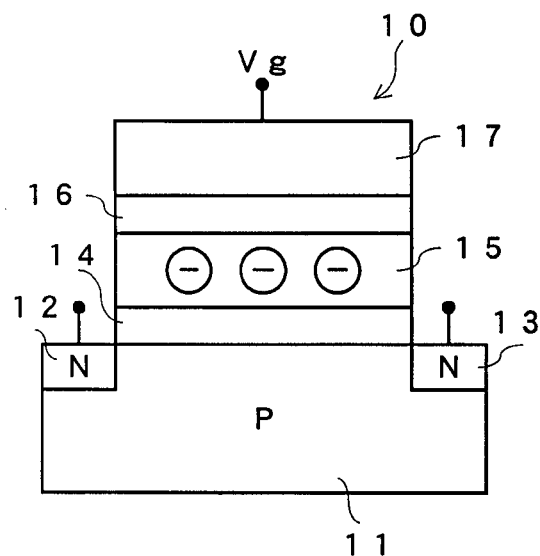
FIG. 1B is a schematic view showing a state where electrical charges are accumulated in the multi-level flash memory.
Figure 2:
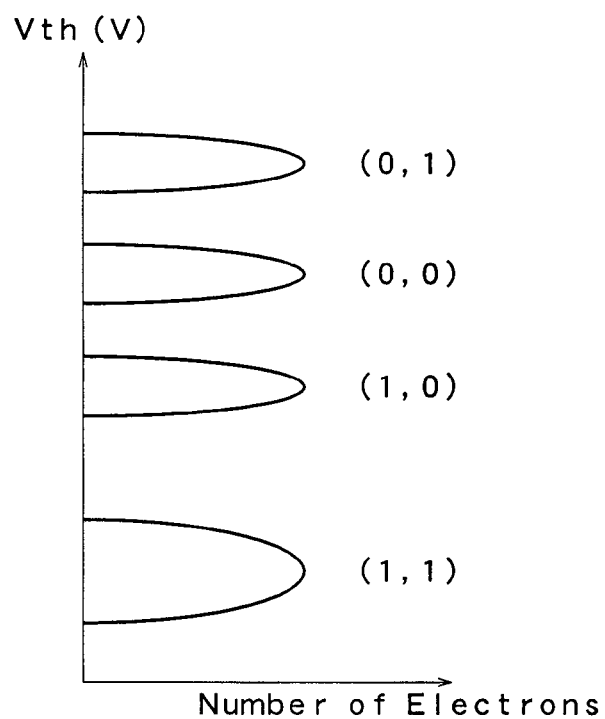
FIG. 2 is a schematic view showing an electron accumulating state of the multi-level flash memory.
Figure 3:
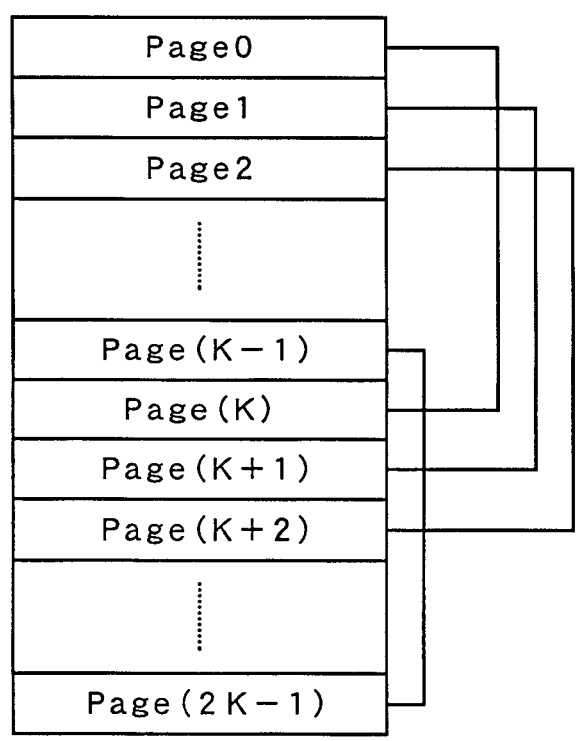
FIG. 3 is a diagram showing cell sharing in a physical block of the multi-level flash memory.
Figure 4:
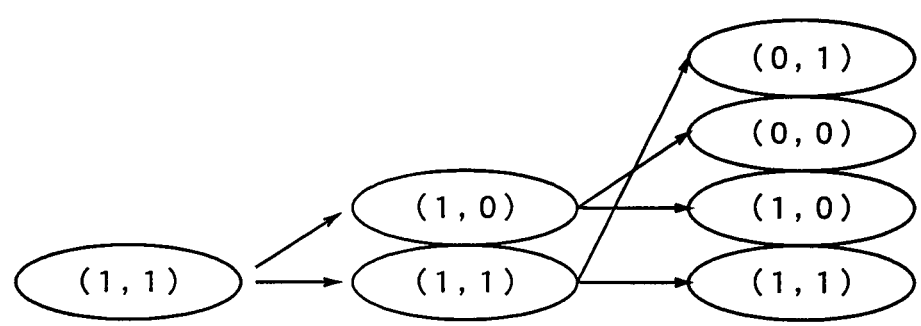
FIG. 4 is a diagram showing transition of a cell state of the multi-level flash memory.
Figure 5:
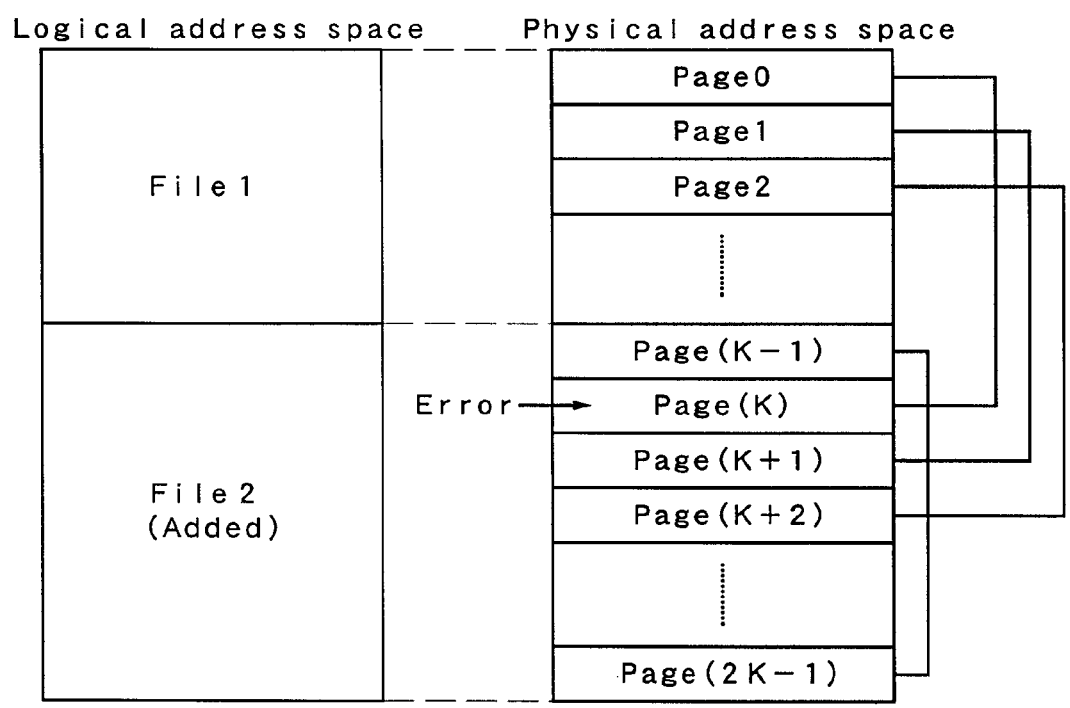
FIG. 5 is an explanatory diagram showing error propagation caused by file addition in a case of the multi-level flash memory.

The flash memory 140 is a four-valued flash memory and includes many physical blocks. Each of the physical blocks is an erasing unit and has 2K (K is natural number) pages. As shown in FIG. 3, the inside of the flash memory is managed by the page number of 0 to (2K−1). K pages with the page numbers 0 to (K−1) are formed of first pages of the memory cells and K pages with the page numbers K to (2K−1) are formed of second pages of the memory cells.

A data reader 150 reads data from the physical block of the flash memory 140 which corresponds to the designated logical block when the read command is issued from the host device 200.

A command analyzer 160 analyzes the command issued from the host device. The command analyzer 160 determines whether or not the command is a write command after power-on. The command analyzer 160 also has a function of analyzing correlation between the write command previously issued and a write command newly issued. The command analyzer 160 includes a timer 161. The timer 161 measures a time elapsed from previous issuance of the write command as a condition for determining whether or not a new block reserve determinator 170 reserves a new physical block.

When data is written to the flash memory 140, the new block reserve determinator 170 determines to reserve a new physical block and then write the data or to additionally write the data to an unrecorded area of the physical block associated with the logical block, based on the analysis result of the command analyzer 160 and state of the physical block which is obtained by a physical block state detector 190.

A block manager 180 includes a logical-physical conversion table 181 and free block management table 182. The logical-physical conversion table 181 associates the logical block indicated from the host device with an address of the physical block in the flash memory which corresponds to the logical block. In the present embodiment, the logical-physical conversion table 181 is stored using an area of a part of the flash memory 140. The free block management table 182 is generated after power-on and represents availability or unavailability of each physical block.

The block manager 180 registers and updates these tables. In data writing, the block manager 180 extracts a new physical block corresponding to the logical block referring to the free block management table 182. The block manager 180 also updates the logical-physical conversion table 181 when a new logical block is allocated to the physical block. Here, the address converter 120 and block manager 180 collectively form a memory manager for managing the memory.

The physical block state detector 190 detects a state of the physical block to be accessed based on information in the block manager 180 and informs the state of the physical block to the new block reserve determinator 170.

Next, FIG. 7 shows an area map of the flash memory 140. The flash memory 140 is formed of A (A is a natural number) physical blocks and in the present embodiment, physical block numbers 0 to (A-1) are assigned to the A physical blocks, respectively. One physical block includes at least one group sharing the memory cell of the multi-level flash memory.

Then, B physical blocks with the physical block numbers 0 to (B-1) (B is a natural number which is smaller than A) form a first area 141 of the flash memory 140 and (A-B) physical blocks with the physical block numbers B to (A-1) form a second area 142 of the memory. User data transmitted from the host is recorded in the first area 141 of the flash memory 140 and system data such as the logical-physical conversion table 181 is recorded in the second area 142.

Given that the logical block numbers are 0 to (B-m) (m>1), the number of physical blocks in the first area of the flash memory, which correspond to the logical blocks, is allocated to be larger than the number of the logical blocks. Thereby, in a case where the written logical block is rewritten, data can be written to the physical block other than the written physical blocks corresponding to the logical blocks. Thus, even when the write commands are intensively issued from the host device to a same logical block, it is possible to prevent that data is intensively written to a same physical block.

The flash memory has following features:
(a) Data cannot be overwritten to the written page.
(b) The flash memory has the life of rewrite number.

For this reason, the logical-physical conversion table 181 showing correspondence between the logical block number and the physical block number is generated and managed by the block manager 180.

The block manager 180 will be described below in detail. As shown in FIGS. 8A and 8B, the logical-physical conversion table 181 includes a logical-physical conversion main table (hereinafter referred to as merely a main table) 181a and a logical-physical conversion auxiliary table (hereinafter referred to as merely an auxiliary table) 181b. The main table 181a shows that a logical block with the logical block number LB0 is mapped to a physical block with the physical block number PB3 and a logical block with the logical block number LB1 is mapped to a physical block with the physical block number PB6. An invalid number A is recorded as a corresponding physical block in the logical blocks with logical block numbers LBL and LB (L+1). This means that no data is written in the logical blocks LBL, LB (L+1).

The auxiliary table 181b shown in FIG. 8B holds the number of the physical block added when a plurality of physical blocks are allocated to one logical block. The number of registrations in the auxiliary table 181b is at least 1 and here, it is assumed that the number of registrations is 1.

The block manager 180 manages the blocks of the whole semiconductor memory device while managing the free block management table 182. FIG. 9 shows an example of the free block management table 182 and represents a use state of each physical block. The physical block in a use state "1" is being used and the physical block in a use state "0" is a free block and can be newly used.

When power is supplied, the block manager 180 initializes all blocks in the free block management table 182 to be put into a free state and updates a bad block to be a used block. Since management of a bad block falls outside the subject matter of the present invention, detailed description thereof is omitted. The bad block is written to a fixed position of the flash memory. Next, the logical-physical conversion table 181 is read and the used physical block is updated to be a used block based on the logical-physical conversion table 181. When the written logical block is rewritten, the free block management table 182 is randomly searched to select a free physical block as a new physical block. When data is written to the selected physical block, the block is updated to be a used block and a previous physical block corresponding to the logical block is updated to be a free block.

Figure 10:
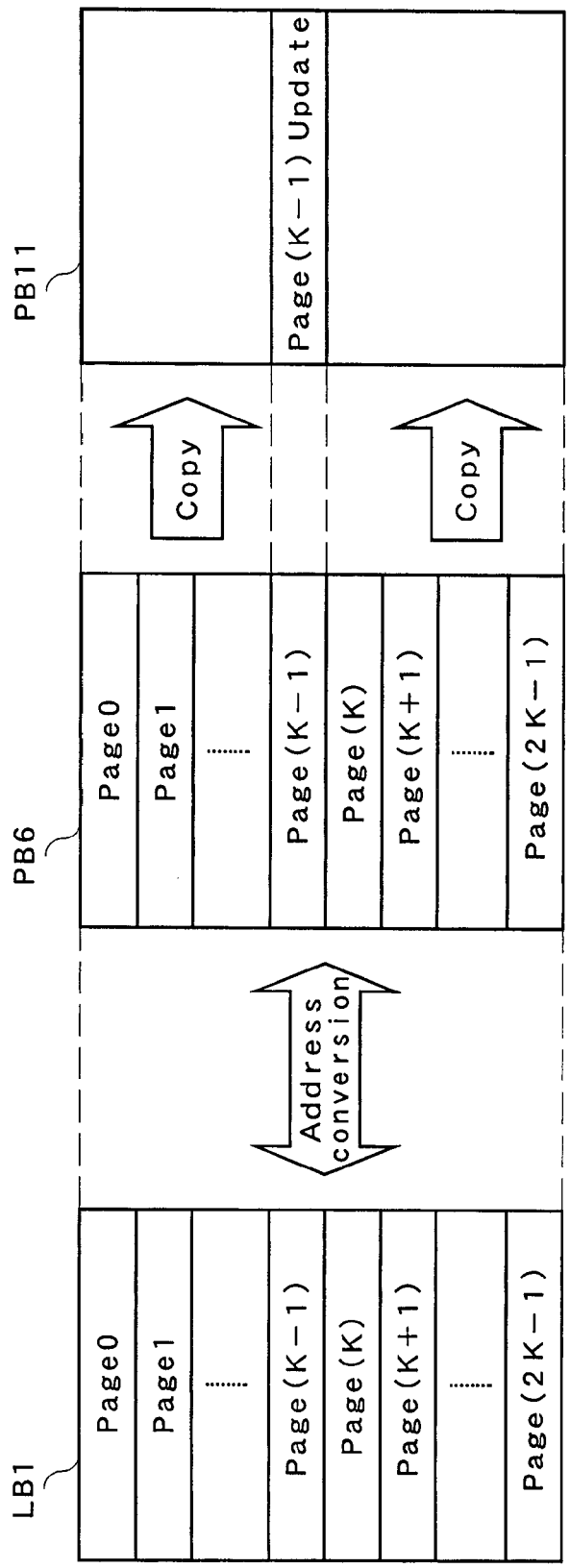
FIG. 10 is an explanatory diagram in a case where partial rewriting in a physical block is performed.

Next, data update will be described. FIG. 10 is a diagram showing a case where data in a logical block corresponding to a size of one physical block, for example, LB1 is recorded in one physical block, for example, PB6. Here, in a case where an area of a part of the logical block LB1, for example, the page (K−1) is rewritten, it is required that the new physical block of the flash memory 140 is extracted and erased, and then desired data is written to an area necessary for rewriting, and data in an area of the physical block PB6 other than the area necessary for rewriting is copied to a page corresponding to the new physical block. In FIG. 10, in a case where the page (K−1) is rewritten, the new physical block, for example, PB11 is extracted, data in the page (K−1) is written to the block and data in pages other than the page (K−1) is copied. However, when the processing is performed every rewriting, there are problems in terms of the writing speed and the number of times of rewriting. In terms of the writing speed, in writing to a part of the physical block, writing to the physical block occurs each time, requiring the writing time for the physical block. In terms of the number of times of rewriting, similarly, larger number of times of writing than necessary is needed, resulting in reduction of the life of the flash memory 140.

Figure 11:
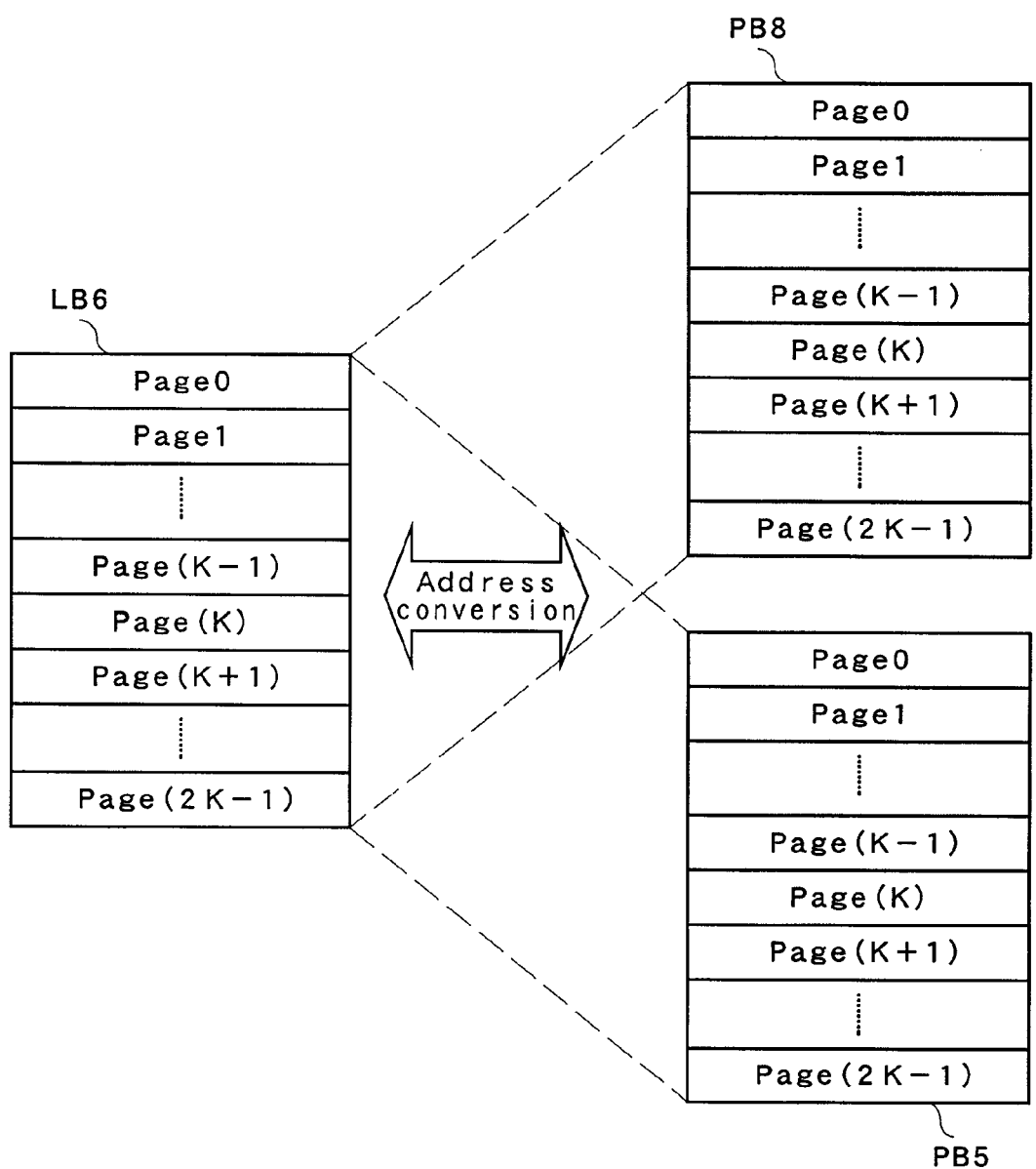
FIG. 11 is an explanatory diagram in a case where a logical address space is formed of two physical blocks in the present embodiment.

Accordingly, in the present embodiment, two physical blocks are temporarily associated with one logical address. FIG. 11 shows address conversion performed by the address converter 120 in which one logical address space is formed of two physical blocks. A left side of FIG. 11 shows one logical block, for example, LB6 and data in this logical block is recorded in one physical block, for example, PB8. To rewrite a part of the logical block LB6 at this time, another new physical block is reserved. For example, a physical block PB5 is reserved while keeping a physical block PB8 and the data is also written to a physical block PB5 side. In a case where data is additionally written, the latest data forms data in the logical address space as latest data, and in the case where data is not additionally written, the data recorded in the physical block PB8 forms data in the logical address space. In this manner, when writing to the second physical block is performed, an error is not propagated to the data recorded in the first physical block.

Figure 12:
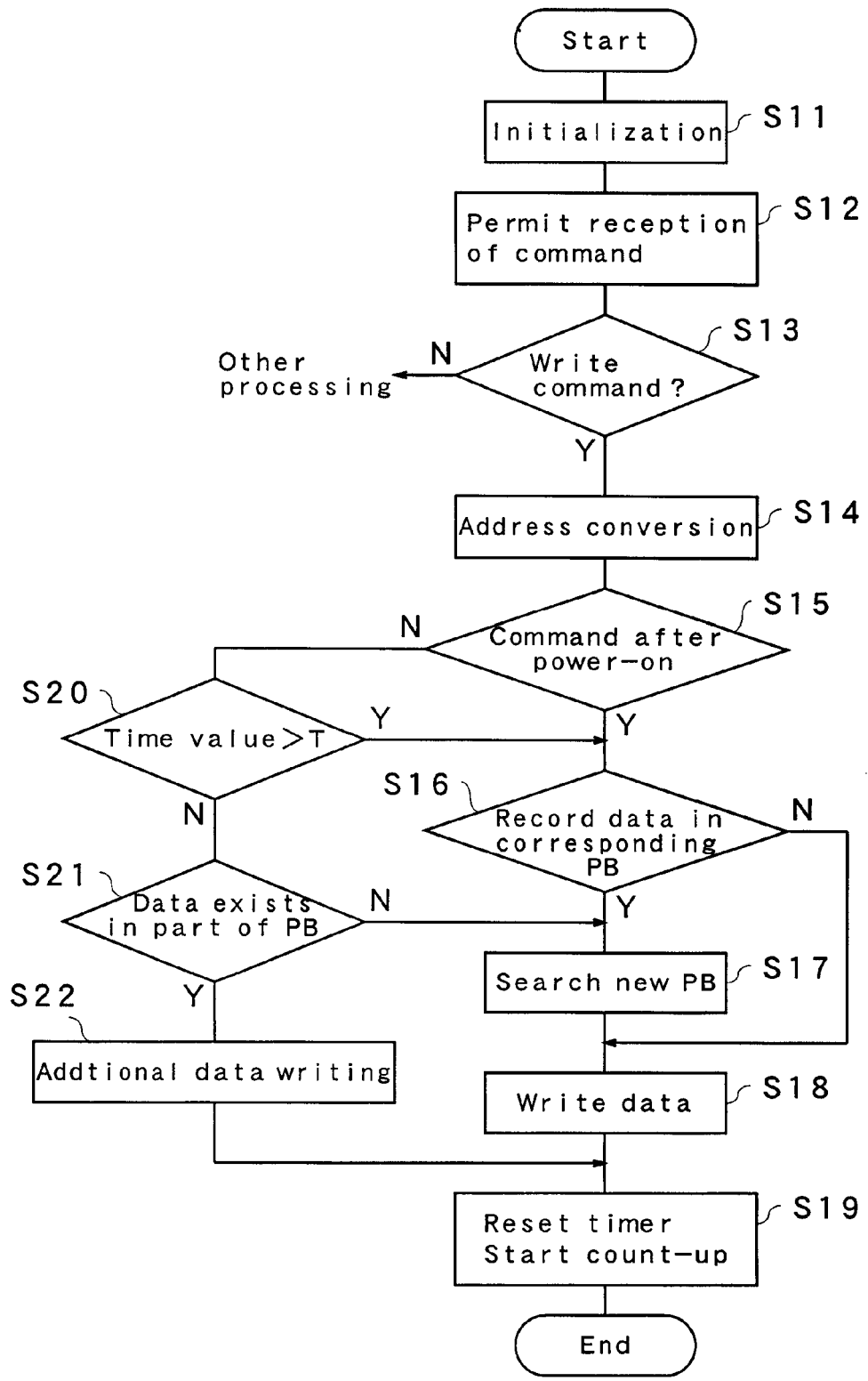
FIG. 12 is a flow chart showing an operation of the semiconductor memory device in the present embodiment.

Next, whole operation of the semiconductor memory device will be described in detail. FIG. 12 is a flow chart showing an operation in the present embodiment and FIG. 13 shows a use example. Here, it is assumed that the host device 200 is a camera recorder, the semiconductor memory device 100 is a medium for storing an image of the camera recorder and about 30 images per second are generally recorded as moving images. In recording images, the images are continuously stored in a memory areas of consecutive addresses. If power disconnection suddenly occurs in recording, it is difficult to record an image frame at the instant. Thus, at occurrence of power disconnection, an image of about 33 ms may not be recorded. In addition, cell sharing may influence on data in the physical block including a record position. Accordingly, in the present embodiment, in a case where a file recorded at a past a predetermined time or earlier exists, it is controlled so as not to exert an influence on the file. Here, a specific example of the operation of preventing influence on the data recorded at a past one second or earlier is shown.

A pattern 1 in FIG. 13 is an explanatory diagram of recording immediately after power-on. At recording immediately after power-on, since destruction of a past file cannot be permitted, when the write command is issued, data is written to a new physical block. First, a power source of the semiconductor memory device 100 is turned on, and the semiconductor memory device 100 initializes each internal module at S11. When the initialization is finished, since the initialization is completed, the command analyzer 160 permits the external interface 110 to receive a command from the host device 200 (S12). The command analyzer 160 manages whether or not writing processing is performed after power-on as a state. After power-on, the command analyzer 160 informs that "writing processing is not performed" to the new block reserve determinator 170.

When the host device 200 issues a write command to the semiconductor memory device 100, the address converter 120 converts a logical address at which the host device 200 requests to write data into a physical address for actual writing (S14). The address converter 120 requests the new block reserve determinator 170 to determine whether or not new block for writing is reserved. The physical block state detector 190 determines that data is written in at least a part of the physical block corresponding to the write command (hereinafter referred to as written state) or data is not written in at least the part of the physical block corresponding to the write command (hereinafter referred to as unwritten state) (S16). Based on the information, when the data is written in at least the part of the physical block, the data is additionally written. Thus, after power-on of the command analyzer 160, the new block reserve determinator 170 determines whether or not the new physical block is reserved in combination with the unwritten state and informs it to the address converter 120. When the physical block state detector 190 determines the state as the written state, the new block reserve determinator 170 determines that the new physical block is reserved. On the other hand, when the physical block state detector 190 determines the state as the unwritten state, the new block reserve determinator 170 determines that the new physical block is not reserved. When the new physical block needs to be reserved, the block manager 180 searches the free block management table 182 to reserve the new physical block (S17). After the new physical block is reserved, the data writer 130 writes data to the flash memory 140 (S18).

According to this method, the previously written file can be written without being destroyed. This will be described in more detail referring to FIG. 14. As shown in FIG. 14, a file 1 is written in a part of the logical block LB6 in the logical address space on a left side of the figure and the file 1 is written in pages 0 to (K−2) of the physical block PB8 corresponding to the logical block LB6. Change of a state of the logical-physical conversion table 181 in this case will be described. FIG. 15A is a logical-physical conversion table showing that the physical block PB8 in FIG. 14 is registered. In other words, the logical block number LB6 in the main table 181a is allocated to the physical block PB8 in the physical address space.

In this state, a file 2 is additionally written to the logical block LB6. In normal writing, the file 2 is written to the page (K−1) to page (2K−1) of the physical block PB8. However, when an error or sudden power disconnection occurs while the file 2 is additionally written to the physical block PB8, the file 1 may be destroyed. Thus, the physical block PB5 is reserved without additionally writing the file 2 to the physical block PB8 and the file 2 is written to the physical block PB5. FIG. 15B shows the auxiliary table 181b used in a case where the logical block corresponds to two physical blocks and as shown in this table, the logical block LB6 is also allocated to the physical block PB5 on a lower right side. By doing so, even when power disconnection suddenly occurs during writing of the file 2, since the physical block to which the file 1 is written is different from the physical block to which the file 2 is written, the file 1 can be prevented from being destroyed.

In this manner, the other file previously recorded is not destroyed by writing according to a write command WC0 shown in the pattern 1 in FIG. 13. At completion of the writing processing according to the write command WC0, the value of the timer 161 is reset and then, the timer starts measurement of time elapsed from completion of writing (S19).

Next, a pattern 2 shown in FIG. 13 shows a case where a predetermined time T has elapsed from completion of data writing according to a previous write command WC1. When a write command (WC2) is issued after the predetermined time T elapsed, a new physical block is reserved and writing to the physical block is performed. In other words, when receiving the new write command (WC2) from the host device 200, the command analyzer 160 moves from S15, S20 to S16. At a step S16, the new block reserve determinator 170 determines whether or not the new block is reserved as in the pattern 1 based on an elapsed time of the timer 161 and a value informed from the physical block state detector 190. When a predetermined time T has elapsed and data is recorded in a corresponding physical block, the memory device writes data to the new physical block. Such process of the pattern can prevent influence on the other file including the file written according to the WC1 and data written at a past a predetermined time or earlier.

However, when all writing is performed in the pattern 1 or pattern 2, problems occur in terms of processing speed and the number of times of rewritings.

Figure 16:
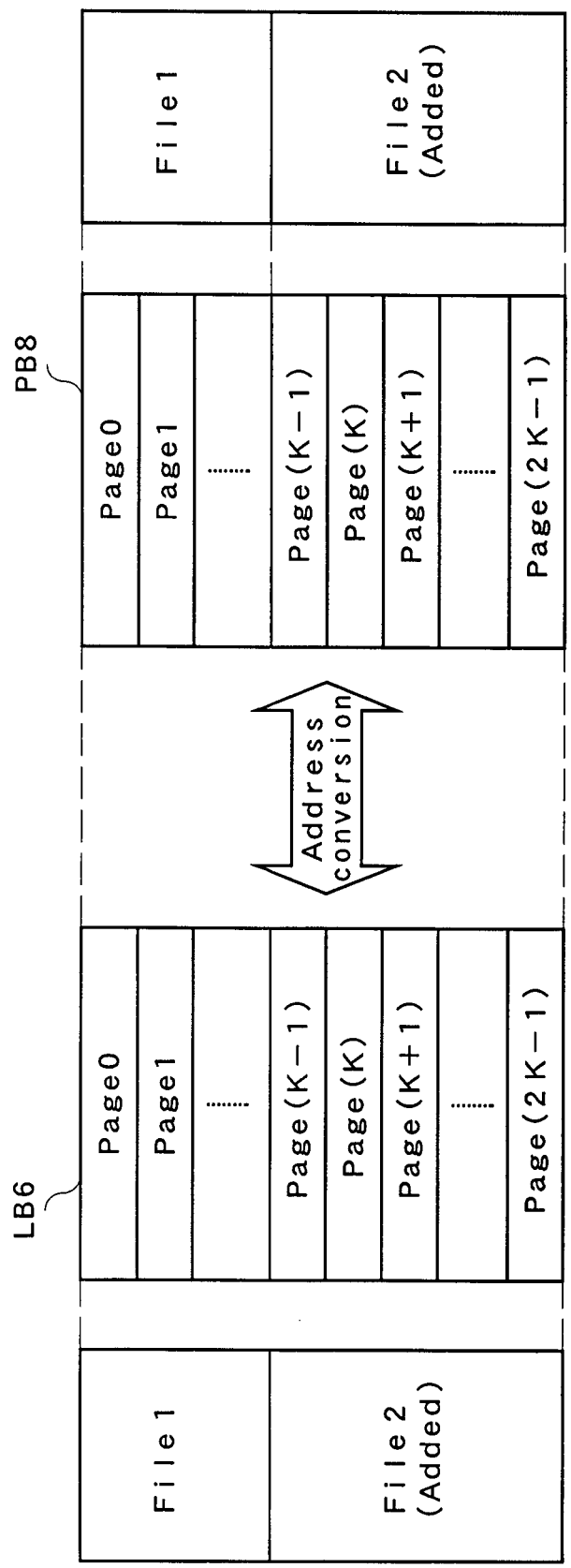
FIG. 16 is an explanatory diagram showing procedure of additionally writing a file to a same physical block in the present embodiment.

A pattern 3 shown in FIG. 13 shows a case where a new write command (WC3) is issued before the predetermined time T has elapsed after completion of the writing processing according to the previous write command (WC1). In this case, since the timer 161 does not count the elapsed time T, the procedure moves from S20 to S21, and when written data exists only in a part of the physical block, the memory device additionally writes data to the physical block without reserving a new block (S22). In other words, as shown in FIG. 16, when the file 2 is added to the logical block LB6 in which the file 1 is written, the file 2 is additionally written to the page (K−1) to page (2K−1) of the physical block PB8. In the processing in the pattern 3, in a case where power disconnection occurs during writing according to the write command (WC2), power disconnection exerts an influence on data sharing the cell. However, only the data written immediately before is influenced and the data recorded at a past a predetermined time or earlier is not influenced. Since this processing does not require reservation of a new block, influence on the number of times of rewriting and writing processing time can be minimized.

In the writing in the patterns 1 and 2, as shown in FIG. 14, one logical block requires two physical blocks, which is a problem in terms of a capacity. For this reason, while writing/reading of data is not performed, it is need to reserve the new block, collect only valid pages from the two physical blocks and aggregate the pages into one physical block. Aggregation processing will be described referring to FIGS. 17 and 18. In the aggregation processing, as shown in a right side in FIG. 17, a new physical block, here, PB10 is reserved. Then, data of valid pages of the two physical blocks PB8 and PB5 which correspond to the same logical block LB6 is collected and copied to the physical block PB10. When copying is completed, as shown in FIG. 18, the main table 181a registers the physical block PB10 with respect to the logical block LB6 and the auxiliary table 181b registers the invalid number A in the logical block LB6.

Figure 19:
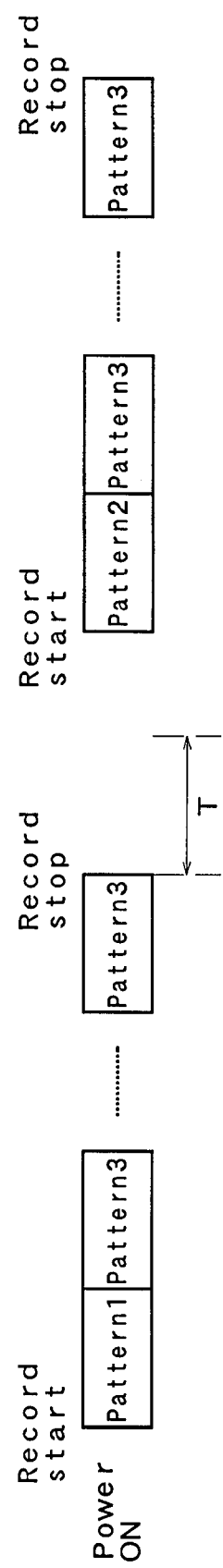
FIG. 19 is a diagram showing writing processing applied to image recording.

Referring to FIG. 19, patterns occurring when the writing processing in the present embodiment is applied to image recording will be described mode specifically. When the image is recorded after power-on, writing in the pattern 1 is performed immediately after start of recording and thereafter, the pattern 3 continues until recording is stopped. In other words, by continuing an additional writing state during recording, the image can be recorded without lowering a transmit speed. When recording is restarted after a stop of recording, writing starts from the pattern 2 and thereafter, the pattern 3 continues until recording is stopped. As described, since writing starts from the pattern 2 at restart of recording, even when power disconnection occurs during recording, an image recorded before restart of recording is not destroyed.

With such a structure, a timer measures an elapsed time from previous writing and in a case where a predetermined time or more has elapsed, a new physical block is reserved so as not to exert an influence on the prior data which should not be destroyed and data is written to the new block. Thereby, even when power disconnection suddenly occurs during writing, the written file is prevented from being destroyed. For writing within a predetermined time, by additionally writing data without reserving the new physical block, influence on the transmit speed and the number of times of rewriting can be eliminated.

Although a case where the semiconductor memory device records the image data from the host device is described herein, also in a case where a personal computer (PC) as the host device writes a file, when one file is written, as shown in FIG. 19, recording in the pattern 1 is performed and subsequently, at least recording in the pattern 3 is performed. Therefore, a similar effect can be obtained.

Although the number of bits stored in one memory cell of the multi-level flash memory is set to two in the present embodiment, the present invention can be applied to a flash memory which increases the state and can store three or more bits in one memory cell.

Needless to say, even when the present invention is applied to a nonvolatile memory other than the flash memory, a similar effect can be obtained. Although the semiconductor memory device records data transmitted from the host device therein in the present embodiment, a device which has the semiconductor memory device in the host device can attain a similar effect.

Although the physical block is described as a minimum erasing unit herein, since the physical block is defined as a block corresponding to the logical block, a size of the physical block may be different from the erasing unit. In this case, the one physical block may have the size as an integral multiple of a minimum erasing unit. In this case, a current state for each erasing unit needs to be managed by a free block management table or the like. The erasing unit can be regarded as a group having a memory sharing relationship in the multi-level flash memory.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese application No. 2008-320706 filed on Dec. 17, 2008 is hereby incorporated by reference.

What is claimed is:

1. A semiconductor memory device connected to a host device comprising:
    a nonvolatile memory including a plurality of physical blocks, each physical block of said plurality of physical blocks including at least one group, wherein a unit sharing a memory cell is a group;
    a data writer for writing data to said nonvolatile memory;
    a data reader for reading data from said nonvolatile memory;
    a memory manager including a logical-physical conversion table for recording correspondence between a logical block according to a command issued by said host device and physical block of said nonvolatile memory, the memory manager converting a logical address given by said host device into a physical address of said nonvolatile memory;
    a command analyzer for analyzing the command received from said host device and analyzing a correlation between the command and a write command issued at least immediately before the command; and
    a new block reserve determinator for determining whether a new physical block is reserved when a write command is issued from said host device,
    wherein
    said command analyzer includes a timer for measuring an elapsed time from completion of data writing according to the write command issued at least immediately before the command, and
    when a timer value exceeds a predetermined elapsed time, even when the physical block corresponding to the logical address at which said host device requests to transmit data is in a written state, said new block reserve determinator determines that a new physical block is reserved without additionally writing data in the physical block.

2. The semiconductor memory device according to claim 1, wherein
    said new block reserve determinator determines that a new physical block is reserved in a case where said command analyzer determines that the first writing processing after power-on is performed, and in a case where writing is performed to the nonvolatile memory after elapse of a predetermined time from the writing according to the write command issued at least immediately before the command.

3. The semiconductor memory device according to claim 1, wherein
    said memory manager registers and updates a free block management table representing availability/unavailability of each physical block of said plurality of physical blocks and extract a new physical block in data writing based on said free block management table.

4. The semiconductor memory device according to claim 1, wherein
    each physical block of said plurality of physical blocks is a minimum erasing unit of said memory or an integral multiple of the minimum erasing unit.

* * * * *